United States Patent [19]

Foster

[11] 4,268,376
[45] May 19, 1981

[54] CRACKING CATALYST REJUVENATION
[75] Inventor: Michael S. Foster, Oakland, Calif.
[73] Assignee: Chevron Research Company, San Francisco, Calif.
[21] Appl. No.: 23,483
[22] Filed: Mar. 23, 1979
[51] Int. Cl.³ .............................................. C10G 11/05
[52] U.S. Cl. ............................... 208/120; 208/52 CT; 208/121; 252/411 R; 252/455 Z; 252/462
[58] Field of Search ........................... 208/120, 52 CT; 252/411 R, 455 Z, 412, 462

[56] References Cited
U.S. PATENT DOCUMENTS

| | | | |
|---|---|---|---|
| 3,930,987 | 1/1976 | Grand | 208/120 X |
| 3,939,058 | 2/1976 | Plank et al. | 208/120 |
| 3,957,623 | 5/1976 | McDaniel et al. | 208/120 |
| 4,055,482 | 10/1977 | Robson | 208/111 |
| 4,137,151 | 1/1979 | Csicsery | 208/120 |
| 4,146,463 | 3/1979 | Radford et al. | 208/120 |
| 4,153,535 | 5/1979 | Vasalos et al. | 208/120 |

Primary Examiner—Delbert E. Gantz
Assistant Examiner—G. E. Schmitkons
Attorney, Agent, or Firm—D. A. Newell; R. H. Davies; W. D. Reese

[57] ABSTRACT

A process is disclosed for cracking hydrocarbons with a faujasite-type zeolite catalyst, in which the catalyst is rejuvenated by ion-exchange with rare earth metal cations to restore its activity.

4 Claims, No Drawings

CRACKING CATALYST REJUVENATION

BACKGROUND OF THE INVENTION

This invention pertains to a method for rejuvenating cracking catalysts. The invention particularly concerns a method for rejuvenating a zeolitic crystalline aluminosilicate cracking catalyst which has been deactivated by cyclic cracking and regeneration.

Catalytic cracking systems employ catalysts in a moving bed or a fluidized bed. The catalytic cracking operation is carried out in the absence of externally supplied molecular hydrogen and is, for that reason, distinctly different from hydrocracking, in which molecular hydrogen is added in processing. In catalytic cracking an inventory of particulate catalyst is continuously cycled between a cracking reactor and a catalyst regenerator. In a fluidized catalytic cracking (FCC) system, a stream of hydrocarbon feed is contacted with fluidized catalyst particles in the hydrocarbon cracking zone, or reactor, at a temperature of about 425°–600° C., usually 460°–560° C. The reactions of hydrocarbons at the elevated operating temperature result in deposition of carbonaceous coke on the catalyst particles. The resulting fluid products are separated from the deactivated, spent catalyst and are withdrawn from the cracking reactor. The spent catalyst particles, containing a substantial concentration of coke, are stripped of volatiles, usually by means of steam, and are then passed to the catalyst regenerator. In the regeneration zone, the coked catalyst is contacted with a predetermined amount of molecular oxygen. A desired portion of the coke is burned off the catalyst, simultaneously restoring catalyst activity and heating the catalyst to a higher temperature required for use in the cracking zone, e.g., 540°–815° C., usually 590°–730° C. Flue gas is formed by combustion of the coke in the regenerator. The flue gas may be treated for removal of particulates and conversion of carbon monoxide, after which it is normally discharged into the atmosphere.

The activity of a cracking catalyst is an important parameter in catalytic cracking operations. A standard measure of the activity of a cracking catalyst is the degree of conversion which can be obtained using the catalyst in a cracking operation. The degree of conversion of feed hydrocarbons obtained in a cracking operation may be defined as the volume percent of fresh hydrocarbon feed having a normal boiling point of at least 221° C. which is changed to gasoline and lighter hydrocarbon products during the cracking conversion step, where the end point of gasoline for the purpose of determining conversion may be defined as 220° C. In addition to being a measure of catalyst activity, the conversion obtained with the catalyst can also be used as a measure of the severity of a cracking operation, so the activity of a catalyst is determined by conversion at a predetermined, standard set of operating conditions. At a given set of operating conditions, a more active catalyst gives a greater conversion than does a less active catalyst. Increased conversion is a desirable attribute in a cracking catalyst. Higher conversion allows flexible operation of a cracking unit. For example, when conversion is raised, feed throughput can be increased, or a higher degree of feed conversion can be maintained with a constant feed throughput.

Because of catalyst attrition, imperfect gas-solids separation, etc., catalyst in a cracking unit is continuously being lost from the circulating inventory. The desired catalyst inventory level is conventionally maintained by constant addition of fresh, or rejuvenated, make-up catalyst. Accordingly, the catalyst inventory in a given FCC unit is a mixture of particles which have been in use for widely varying periods, and which contain varying amounts of coke and contaminants such as metals. The mixture of catalyst particles forming the inventory during normal unit operation is referred to as equilibrium catalyst. The activity of catalyst used in commercial cracking units is generally measured on the basis of the average activity of the equilibrium catalyst. Fresh cracking catalyst is known to possess a much higher activity than equilibrium catalyst or catalyst which has been used in a cracking operation for a relatively short time.

The use of zeolitic crystalline aluminosilicates, or molecular sieves, as the primary, active components in cracking catalysts is well known. Most commercial zeolite-type catalysts contain a molecular sieve of the faujasite crystal structure. Zeolite Y-type molecular sieves are especially favored for use in cracking catalysts. In manufacturing zeolite cracking catalysts, the zeolite component, as synthesized, is subjected to ion-exchange in order to activate and stabilize the zeolite prior to its catalytic use. This ion-exchange procedure typically substitutes protons, proton precursors such as ammonium, or rare earth cations for the sodium cations present in the zeolite as synthesized. The X-type and Y-type zeolites used commonly for cracking catalysts have a faujasite-type crystal structure and have a silica/alumina molar ratio of about 3 to 5. Other zeolites, such as mordenite and ZSM-5-type crystalline aluminosilicates, which have different characteristic crystal structures and have silica/alumina molar ratios above 6, have also been proposed for use in cracking catalysts. In commercial cracking catalysts, the zeolite component is composited with a matrix or binder precursor such as clay or a silica-alumina hydrogen, which facilitates shaping the final catalyst. The matrix material may or may not have some catalytic cracking activity of its own.

Various procedures have been suggested for treating used, deactivated cracking catalysts, such as equilibrium catalyst, in order to increase their activities. It is known in the art that nickel, iron and vanadium which are present in hydrocarbon feeds used in cracking build up on the catalyst and tend to reduce the activity of the catalyst. The contaminant metals can also reduce the product selectivity obtained. Schemes for removing metals from used catalyst have been developed to overcome this problem. For example, U.S. Pat. No. 3,168,481 discloses a process for removing vanadium from cracking catalysts by leaching the catalysts with ammonia. U.S. Pat. No. 3,684,738 discloses acid treatment as a method for treating zeolites which have a high silica/alumina molar ratio in order to activate the zeolite for use in catalytic cracking.

Rejuvenation of zeolite-containing hydrocracking catalysts by various procedures such as aqueous acid or base treatment have been suggested. Hydrocracking catalysts typically include an active metal component, such as a Group VIII metal, which must be highly dispersed on the catalyst matrix to provide optimum catalyst activity. Since the hydrogenation activity of the active metal component in hydrocracking catalysts is of major importance, regeneration schemes used in treating hydrocracking catalysts are normally directed primarily at achieving redispersion of the active metal. For example, U.S. Pat. No. 3,835,028 discloses a method for rejuvenating a zeolite-containing hydrocracking catalyst by an aqueous treatment with an ammonium salt, and U.S. Pat. No. 4,055,482 discloses rejuvenation of a zeolite-containing hydrocracking catalyst by aqueous treatment with an acid.

SUMMARY OF THE INVENTION

In an embodiment, the present invention concerns a process for cracking hydrocarbons comprising circulating between a cracking zone and a catalyst regeneration zone a particulate solid cracking catalyst comprising an acidic zeolitic crystalline aluminosilicate having a faujasite crystal structure; cracking hydrocarbons in contact with the catalyst and depositing coke on the catalyst in the cracking zone at cracking conditions including the absence of added hydrogen, and burning coke from the catalyst with molecular oxygen in the regeneration zone at catalyst regeneration conditions, whereby the cracking activity of the catalyst is decreased; increasing the cracking activity of particles of the catalyst by contacting the particles with an aqueous liquid containing cations of at least one rare earth metal, at ion-exchange conditions, the liquid having a pH of less than 7; and contacting the resulting catalyst particles with hydrocarbons at catalytic cracking conditions including the absence of added hydrogen.

I have found that the activiity of the activated zeolite-containing cracking catalyst can be completely restored by ion-exchanging the deactivated catalyst with an aqueous solution of rare earth cations at a pH below 7. The rejuvenation treatment can be used to restore equilibrium catalyst to essentially the same activity as found in fresh cracking catalyst. The present rejuvenation technique can be used on a slipstream of catalyst withdrawn and reintroduced in a particular cracking unit, or the procedure can be used on bulk catayst recovered from one unit after deactivation and introduced into the same or different cracking unit after rejuvenation in the same manner as fresh catalyst.

DETAILED DESCRIPTION OF THE INVENTION

The method of the invention is directed to a cracking process including rejuvenation of a cracking catalyst containing a zeolitic crystalline aluminosilicate having a faujasite crystal structure. Preferably, the catalysts employed in the process of the invention are those which contain a crystalline aluminosilicate having a Zeolite Y-type crystal structure or a Zeolite X-type crystal structure, especially Y-type zeolites. Zeolite X is discussed in U.S. Pat. No. 2,882,244, and Zeolite Y is discussed in U.S. Pat. No. 3,130,007, the disclosures of which are incorporated herein. Zeolites in general and the faujasite-type zeolites in particular are also discussed in the book "Zeolite Molecular Seives" by Donald W. Breck (1974), the disclosure of which is incorporated herein.

The zeolite is preferably composited or associated with a matrix or binder material in the cracking catalyst in a manner well known to those skilled in the art. Typically, a zeolite used in a cracking catalyst is dispersed in a porous refractory matrix, which is commonly an inorganic oxide. Suitable inorganic oxides include, for example, silica, alumina, magnesia, boria, bauxite, titania, etc. Other suitable materials include silicon carbide, natural- and treated clays, kieselguhr, diatomaceous earth, kaolin, mullite, etc. Mixtures of two or more of the above-mentioned materials with each other or with other materials may also be employed. Preferred matrix materials for use with the zeolite component are synthetic siliceous gels or cogels or natural siliceous materials such as clays, which may be treated e.g. by acid leaching. Particularly suitable materials include amorphous mixtures of inorganic oxides such as silica-alumina, silica-magnesia, and such amorphous oxides combined with natural clays and clay-like materials, with amorphous silica-alumina mixtures being particularly preferred.

The catalysts employed in the present process can be prepared originally in any conventional manner, as by dispersing particles of the zeolite component in a hydrogel of the inorganic oxide matrix material or other matrix material, or by mixing solid particles of the zeolite and a porous refractory matrix material. Particles of a suitable size can be prepared by spray-drying, pelleting, extrusion, or other suitable conventional means.

The process of the invention is used for cracking hydrocarbons. The hydrocarbons which can be employed include conventional catalytic cracking feedstocks which are typically a mixture of aliphatic and aromatic hydrocarbons boiling above about 221° C. The same hydrocarbon cracking feeds normally processed in commercial catalytic cracking systems may be processed in a system employing the present invention. Suitable feedstocks include, for example, petroleum distillates or residuals, either virgin or partially refined. Conventional gas-oil cuts are suitable, as are atmospheric and vacuum residua. So-called "synthetic" feeds, such as coal oils, bitumen and shale oils, are also suitable for processing according to the invention. Suitable feedstocks normally boil in the range from about 221°–600° C. or higher. A suitable feedstock may include recycled hydrocarbons which have already been subjected to a cracking operation, such as light, medium and heavy cycle oils. Suitable feeds may have been previously treated or refined to remove sulfur nitrogen or metals, as by fixed-bed catalytic treatment in the presence of hydrogen.

According to the invention, a zeolite-containing catalyst is first circulated in a conventional manner between a catalytic cracking reactor and a cracking catalyst regenerator. In the cracking reactor, the catalyst particles are contacted with feed hydrocarbons at cracking conditions. This forms cracked hydrocarbon products, such as 25°–220° C. boiling-range naphtha, and deposits a substantial portion of carbonaceous coke on the catalyst. Cracking conditions employed in the present process may be obtained in part by pre-heating or heat-exchanging hydrocarbons before they are cracked to bring them to a temperature of about 315°–400° C. before introducing them into the cracking zone, but feed pre-heating is not essential. Cracking conditions include a temperature of about 425° C. to about 600° C., preferably 460° C. to 560° C. Cracking conditions also include a pressure in the range from about 1 atmosphere to about 4 atmospheres or more, preferably about 2 atmospheres to about 3 atmospheres. In fluidized catalyst systems, a catalyst/hydrocarbon weight ratio of about 3 to about 10 is generally suitable. A hydrocarbon weight hourly space velocity in the cracking zone of about 5 to about 50 per hour is preferably used. The average amount of coke contained in the so-called spent catalyst after contact with hydrocarbons in the cracking zone, when the catalyst is to be passed to the regenerator, is preferably between about 0.5 weight percent and about 2.5 weight percent. The exact coke concentration on the spent catalyst will depend partly on the desired carbon content of regenerated catalyst in the particular system, as well as on the heat balance of the given system. The cracking, or reaction, zone, may be of conventional design and may use dilute-phase, fluidized-catalyst contact, riser-type entrained catalyst contact, dense-bed fluidized-catalyst contact, countercurrent contact, or a combination thereof between the hydrocarbons and the catalyst particles. Catalyst fluidization, entrainment and other movement may be assisted by use of gases such as steam or nitrogen.

The catalyst regeneration zone used in the process of the invention may also be of conventional design suitable for use in regenerating cracking catalyst. The gaseous atmosphere within the cracking catalyst regenerator normally includes a mixture of gases which vary in concentration according to the locus within the regenerator. The concentrations of various gases also vary according to the coke concentration on spent catalyst entering the regenerator and according to the amount of molecular oxygen and steam introduced into the regenerator. Generally, the gaseous atmosphere in the regenerator contains 5–25% steam, varying amounts of oxygen, carbon monoxide, carbon dioxide and nitrogen. The regeneration conditions suitably include a temperature of about 538° C. to 815° C.; preferably a temperature of about 600° C. to about 700° C. Regeneration is preferably carried out in a dense-phase fluidized bed of catalyst particles, with "dense-phase" being defined as a density of at least 160 kg/m$^3$. The pressure used in the regeneration zone is preferably approximately the same as that used in the cracking reaction zone, for convenience of catalyst transfer.

Further according to the invention, catalyst particles which have become deactivated by use in the cyclic cracking and catalyst regeneration steps are subjected to treatment with a liquid aqueous solution containing cations of one or more rare earth metals. Fresh cracking catalyst becomes substantially permanently deactivated after a period of use in commercial cracking units, often as short as 1–2 days, and equilibrium catalyst in a commercial cracking unit has a substantially lower activity than does fresh catalyst. Preferably the ion-exchange, rejuvenation treatment of the present process is carried out on equilibrium catalyst or on catalysts having an equivalently relatively low activity as a result of use in cracking. The relative activity of catalysts can, if necessary, be determined by one of the well-known activity tests currently used, such as the standard microactivity test.

In the ion-exchange treatment of the invention, catalyst particles are contacted with an aqueous liquid containing cations of at least one rare earth metal at ion-exchange conditions. Rare earth metal cations which may be used may be those of a single lanthanide metal, preferably lanthanum, or may conveniently be those of a mixture of two or more rare earth metals. The aqueous liquid used should have a pH of less than 7 and preferably less than 5. The concentration of the rare earth metal cation in the ion-exchange solution may be maintained within conventional ion-exchange solution limits. A solution containing about 15 weight percent of the rare earth compound gives good results. The length of time for which the contact between the catalyst particles and the aqueous solution is carried out is generally between about 1 minute and 24 hours. Preferably, the ion-exchange operation should include a total contact time of from 5 minutes to 2 hours between catalyst particles and ion-exchange solution. Ion-exchange temperatures are preferably from 20° C. to 100° C. and particularly from 25° C. to 80° C. In general, conventional ion-exchange procedures and apparatus can be used effectively in the ion-exchange step of the present process. The ion exchange may include two or more successive treatments with the same or different solutions of the same or different rare earth metal cations.

Catalyst particles which are to be subjected to the ion-exchange operation can be removed from a cracking system from any stage in the operating cycle. Surprisingly, spent catalyst, which contains a relatively high coke concentration, is just as effectively rejuvenated by the ion-exchange treatment as is relatively coke-free regenerated catalyst. Accordingly, in one preferred embodiment of the invention, the catalyst particles to be rejuvenated by contact with the aqueous liquid are removed from the spent catalyst stream in a cracking system.

Preferably, the present rejuvenation process is carried out in one of two modes. In one preferred mode, a slipstream of equilibrium catalyst is removed from the catalyst inventory circulating in the cracking system. The slipstream is subjected to the ion-exchange rejuvenation procedure and is then returned to the circulating catalyst inventory. In this mode, the ion-exchange, rejuvenation step of the process is included as an integral catalyst handling step in the cracking system. The catalyst make-up rate in a cracking system, conventionally maintained high enough to maintain the desired activity level in the reactor, can be substantially reduced when the ion-exchange, rejuvenation step is included in the system, since the rejuvenation operation provides a stream of catayst having an activity substantially equivalent to that of fresh catalyst. In another mode of carrying out the invention, bulk equilibrium or deactivated catalyst from one or more cracking systems can be treated in the ion-exchange step, and the resulting catalyst can then be introduced into service in the same or different cracking systems in essentially the same way as fresh catalyst. In this mode, the ion-exchanged, rejuvenated catalyst can be employed in the same or a different unit from that in which it was originally used. When reintroduced into a cracking system, the ion-exchanged, rejuvenated catalyst is superior to fresh catalyst, since it is more attrition-resistant.

EXAMPLE

Two commercially available cracking catalysts, designated Catalyst A and Catalyst B, were used in the tests. Catalyst A uses a rare earth-exchanged Y-type zeolite, and Catalyst B uses a hydrogen-exchanged Y-type zeolite. A fresh sample of each catalyst was slightly steamed and tested for n-decane cracking activity. Samples of used, equilibrium catalyst of both kinds were tested in the same procedure. Other samples of the used equilibrium catalysts were first subjected to the rare earth-exchange rejuvenation operation of the invention, and then tested for cracking activity. In the ion-exchange operation, the equilibrium samples were contacted with an approximately 15 weight percent aqueous solution of lanthanum nitrate at 80° C. for about 1 hour at a pH of 4.5. In the n-decane cracking tests, pulses of n-decane in a helium carrier were passed over the sample being tested at a temperature of 427° C. (800° F.) and the products were determined by chromatographic analysis. Activity was determined on the basis of n-decane converted to $C_1$-$C_9$ hydrocarbons. The results of the n-decane pulse tests are shown in the following Table.

TABLE

| | Relative Cracking Activity | | |
|---|---|---|---|
| | Fresh | Equilibrium | Rejuvenated |
| Catalyst A | 7.6 | 1.0 | 24 |
| Catalyst B | 2.3 | 0.13 | 2.1 |

It is apparent from the results shown in the Table, that the rejuvenation procedure of the invention provides an effective method for restoring or even increasing the cracking activity of catalysts which have been deactivated by use in catalytic cracking.

Preferred embodiments of the invention having been described, various modifications, alternatives and variations of the invention will be apparent to those skilled in the art, and these are intended to be within the scope of the appended claims.

What is claimed is:

1. A process for cracking hydrocarbons comprising:
   (a) circulating between a cracking zone and a catalyst regeneration zone a particulate solid cracking catalyst comprising an acidic zeolitic crystalline aluminosilicate having a faujasite crystal structure;
   (b) cracking hydrocarbons in contact with said catalyst and depositing coke on said catalyst in said cracking zone at cracking conditions including the absence of added hydrogen and burning coke from said catalyst with molecular oxygen in said regeneration zone at catalyst regeneration conditions, whereby the cracking activity of said catalyst is decreased;
   (c) increasing the cracking activity of particles of said catalyst by contacting said particles with an aqueous liquid containing cations of at least one rare earth metal at ion-exchange conditions, said liquid having a pH of less than 7; and
   (d) contacting the resulting catalyst particles with hydrocarbons at catalytic cracking conditions including the absence of added hydrogen.

2. A process according to claim 1 wherein said crystalline aluminosilicate has a Zeolite Y-type crystal structure.

3. A process according to claim 1 wherein said catalyst includes from about 5 to about 50 weight percent of said crystalline aluminosilicate associated with a porous inorganic oxide.

4. A process according to claim 1 wherein said particles are contacted with said aqueous liquid after passing through said cracking zone and before the resulting coke is burned off.

* * * * *